Patented Dec. 6, 1932

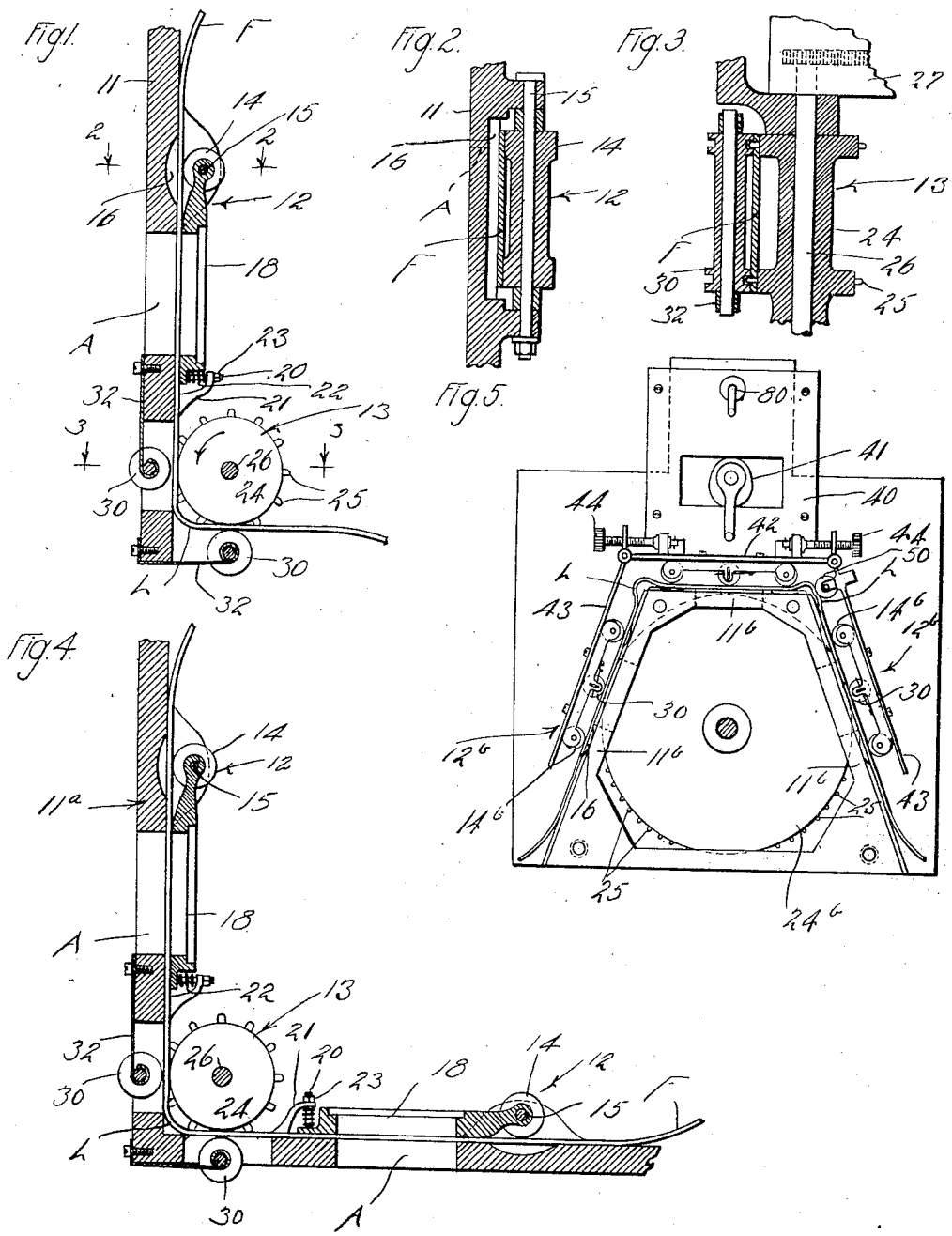

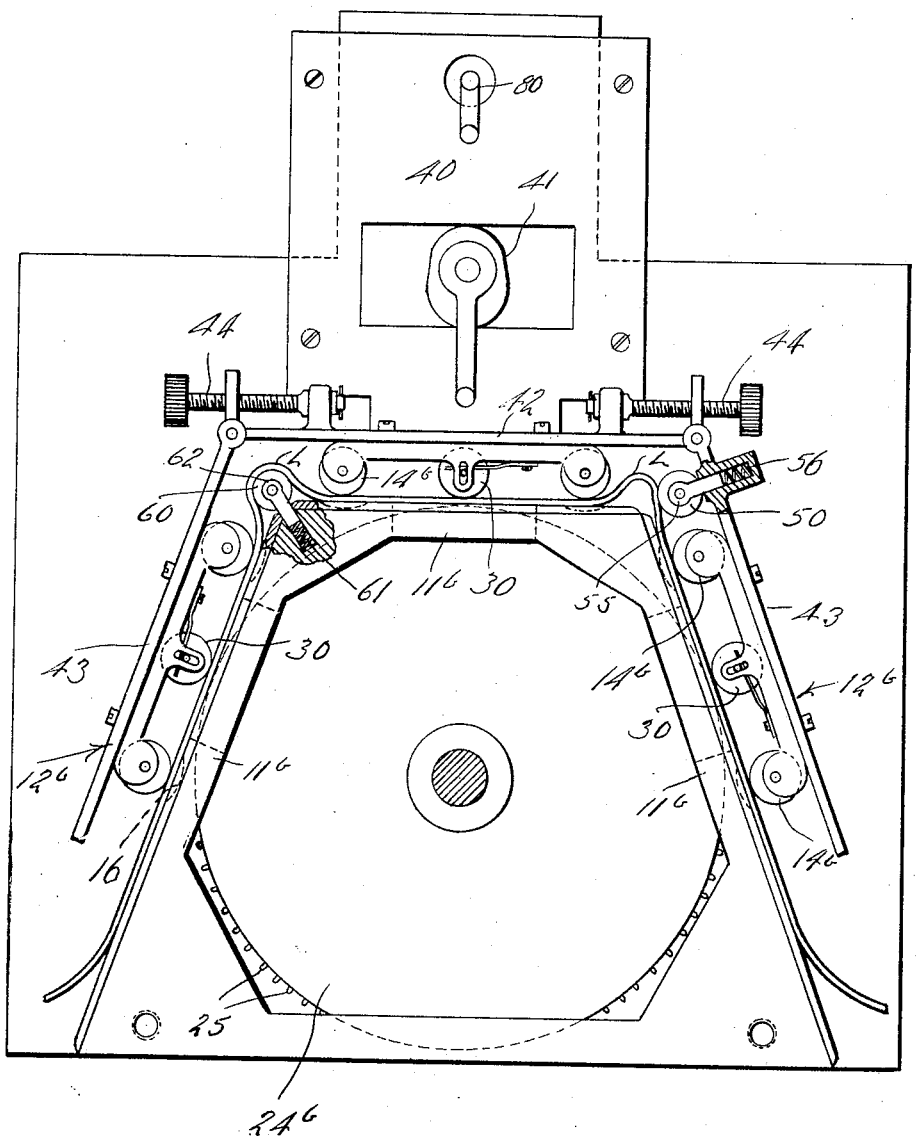

1,890,172

UNITED STATES PATENT OFFICE

WALTER L. WRIGHT, OF SANTA MONICA, CALIFORNIA, ASSIGNOR TO SYNCHROME CORPORATION, OF LOS ANGELES COUNTY, CALIFORNIA, A CORPORATION OF CALIFORNIA

FILM HANDLING MECHANISM

Application filed February 29, 1928. Serial No. 258,039.

This invention relates to a film handling mechanism useful generally in the art of photography and intended particularly for use in motion picture cameras, projectors, and other like equipment handling strips of film, or the like. It is a primary object of this invention to provide a film handling mechanism which is positive and accurate in operation and which handles film without injurious strains or pressures.

Strip film, for example, motion picture film, as handled in the ordinary film handling mechanism of a camera projector, printer, or other such device, is operated or advanced by a feed sprocket, claw mechanism or other suitable device and is held under tension, usually through pressure shoes engaging its marginal portions, so that it resists movement and is thus maintained in accurate position with reference to the movement mechanism. In some cases the definite positioning of the film with reference to the movement mechanism or with reference to an exposure aperture, or the like, is obtained through pilot pins which positively hold the film when not in motion. The holding of the film through pressure shoes, or the like, causes a drag or load on the mechanism and often results in injury to the film particularly if the film is new and the emulsion soft. Pilot pin mechanisms used in holding film are necessarily more or less complicated, expensive to manufacture, and involve moving or reciprocating parts undesirable in apparatus of this character.

It is a primary object of my present invention to provide a film handling mechanism in which the film is definitely positioned without the use of friction or drag means, pilot pins, or other such mechanisms.

An important object of this invention is to utilize pressure generated through distortion of the film itself to definitely position the film in the mechanism.

Another object of my present invention is to provide a film handling mechanism in which the film may be definitely positioned with reference to a plurality of parts or members, for instance, with reference to a plurality of apertures, without the use of pilot pins, drag means or other complicated or injurious means.

The various objects and features of this invention will be best and more fully understood from the following detailed description of typical forms and application of the invention throughout which description I refer to the accompanying drawings in which:

Fig. 1 is a sectional view of a simple, single aperture mechanism embodying the present invention and showing a film in operating position in the mechanism.

Fig. 2 is a detail transverse sectional view of certain of the parts shown in Fig. 1, being a view taken as indicated by line 2—2 on Fig. 1.

Fig. 3 is a detailed sectional view taken as indicated by line 3—3 on Fig. 1.

Fig. 4 is a sectional view illustrating another form of mechanism embodying the invention, being a view illustrating the manner in which the invention provides for definitely relating a film with reference to two parts such as two apertures.

Fig. 5 is a view illustrating another form and application of the invention in which the film is definitely related to a plurality of apertures, and Fig. 6 is a view illustrating a form of mechanism similar to that shown in Fig. 5 and embodying various features of construction that may be incorporated in the mechanism.

My present invention is useful generally in handling strips of film, or the like, where it is desired that the film be handled with a minimum amount of drag or friction and so that it is definitely related with reference to one or more apertures or other parts.

In view of the fact that the invention is particularly useful in handling film such as is used in the production of motion pictures I will refer to the invention as carried out on motion picture film F and I will refer to forms of construction that may be used in handling motion picture film. It is to be understood, of course, that the ordinary or standard form of motion picture film includes a body, in the form of a strip of celluloid, or the like, and one or more coatings of emulsion on the body. The pictures are arranged on the film F so that the marginal portions of the film are blank to accommodate perforations 10 to be engaged by film handling devices such as sprockets, claw mechanisms, etc.

The mechanism provided by this invention includes, generally, a main part such as an aperture plate 11, means 12 for guiding the film F with reference to the aperture plate 11 and film operating means 13.

In Figs. 1 to 3 of the drawings, inclusive, I illustrate a simple form of aperture plate having a single exposure aperture A, and I show the film guiding means 12 at the rear of the plate to freely guide the film F in proper register with the aperture A. The film guiding means set forth in this application includes the principles of invention set forth and claimed in my co-pending application entitled Film guiding mechanism filed on even date herewith. The film guiding means 12 illustrated includes a fixed guide such as a roller 14 mounted behind the plate 11 so that it will operate to guide the film F straight at the aperture A. The roller 14 is rotatably carried on an axle 15 fixed in position so that there is just sufficient space between the rear surface of the plate 11 and the roller 14 to accommodate or pass the film F. A recess 16 is provided in the rear side of the aperture plate 11 opposite or immediately under the roller 14 to pass patches or other irregularities that may occur in the film F. The recess 16 is made sufficiently deep to allow the film F to bend or extend into it as a patch or other irregularity passes the roller 14. The film guiding means 12 may further include a gate 18 for guiding film at the apertured portion of the plate 11. The gate may be pivotally mounted, for instance, on the axle 15 so that it is operable away from the film F. In the drawings I have disclosed an arrangement for normally yieldingly holding the gate 18 just far enough behind the plate 11 to allow passage of the film F. This arrangement includes a screw threaded stud 20 projecting rearwardly from the gate 18 through a fixed bracket 21. A compression spring 22 is arranged between the rear of the gate 18 and the bracket 21 and an adjusting nut 23 is applied to the outer end of the projection 20. The nut 23 can be adjusted to stop the gate 18 in the desired position behind the plate 11 while the spring 22 allows the gate to operate away from the plate to pass any irregularity that may occur in the film.

The film operating means 13 provided by my invention not only operates to advance the film the desired amount and at the desired intervals but also engages the film so that it bears a definite predetermined relation to the aperture A or other desired part. This means includes generally two spaced film engaging parts related to engage the film so that it has a looped or distorted part between them.

In the preferred form of the invention the means 13 includes a sprocket 24 having film engaging teeth forming the parts operable to engage the film in the manner above-mentioned. In the drawings I have shown the sprocket 24 mounted on the drive shaft 26 of an intermittent movement mechanism 27. The sprocket 24 is mounted so that it will operate to move or advance the film F past the aperture A in the plate 11 and the film F is arranged on the sprocket 24 so that it operatively engages two spaced points around the sprocket and thus has a looped part L as shown in Fig. 1. This looped part L may be free of the sprocket, i. e., of the sprocket teeth and being looped or distorted tends to straighten out or return to its normal straight condition and thus bears in opposite directions at the spaced points of engagement with the sprocket or sprocket teeth. This looping of the film thus keeps the film bearing in a definite predetermined manner on the sprocket 24 and therefore keeps the film definitely positioned with reference to the aperture plate 11. If the sprocket 24 is operated as indicated by the arrow in Fig. 1 to draw or pull the film F between the plate 11 and guide means 12 the loop L acts to firmly hold the film on the teeth 25 in the manner in which it normally tends to bear.

In practice it is desirable to provide means for assuring proper engagement of the film with the sprocket 24, for instance, rollers 30 may be arranged to hold the film in the desired engagement with the space sprocket teeth 25, as shown in Fig. 1. The rollers may be carried on spring arms 32 so that they are yieldingly supported and thus accommodate irregularities such as may occur in the film.

In Fig. 4 of the drawings I illustrate a form of the invention wherein there is a main part or body 11a having two spaced exposure apertures A. In this case the body 11a has two parts each of which is in the nature of an aperture plate and in this case these parts are angularly disposed with reference to each other. Each part or aperture plate may be provided with film guiding means 12 corresponding in construction and action with the film guiding means above described. The film operating means 13 is provided at the connection between the aperture plates, being located in the acute angle formed between the plates. In this form of the invention the film F is applied to the sprocket 24 to have the loop part L which operates to urge the film in opposite directions from the sprocket. The loop part L in urging the film against the two spaced sprocket engaging points operates to maintain the film in the proper predetermined position with reference to both apertures A. This form of the invention is set forth to illustrate the manner in which the looped engagement of the film with the feed sprocket may be used to definitely locate spaced parts of the film with reference to spaced parts of the mechanisms such as the apertures A. It is to be understood of course that any suitable form of optical system may be utilized in connection with the invention to project or direct light through the spaced apertures.

In Fig. 5 of the drawings I disclose a form of the invention including a body having a plurality of spaced apertured parts or plates 11b, film guiding means 12b in connection with the aperture plates and film operating means 13b for advancing the film and engaging the film so that it positions itself with reference to the aperture plates. The general construction and arrangement of parts included in this form of the invention is fully set forth and claimed in my co-pending application entitled Motion picture apparatus, filed September 15, 1926, Serial No. 135,524, Patent No. 1,688,607 issued Oct. 23, 1928. In this mechanism there is a single large film operating sprocket 24b having film engaging teeth 25. The aperture plates 11b are tangentially disposed with reference to the sprocket. In the particular case illustrated the aperture plates are related to form angles of about 120 degrees. The film guiding means 12b shown in connection with the aperture plates 11b are carried by a single movable carrier 40 movable into and out of operating position through suitable means such as a cam 41. The carrier 40 has a main or central part 42 carrying the film guiding means for the central aperture plate and extensions 43 connected to the ends of the part 42 and carrying the film guiding means for the other two aperture plates. I have shown the extensions 43 pivotally connected to the part 42 and adjustable through suitable screw means 44. The entire carrier is operable by means of the cam 41 into and out of position where the film guiding means are in operating position. Each film guiding means 12b may include spaced rollers 14b adapted to be positioned with reference to the aperture plate to pass the film F without binding it or causing excessive friction. Further this means may include a spring supported roller 30 operating on the film where it is in engagement with the teeth of the sprocket to hold the film on the teeth. It is to be understood of course that recesses 16 may be provided in the aperture plate under the rollers 14b to provide relief when a patched or distorted part of the film passes through the mechanism. In this case the film is arranged on the sprocket 24b to have a looped part L between each aperture plate. In this form of the invention the sprocket teeth 25 engage the film directly at or opposite the exposure apertures. The looped parts L of the film due to the resiliency of the celluloid body of the film tend to move or urge the film in both directions. In the case of three apertures as shown in the drawings the action of the loops causes the film to be definitely held in pressure engagement with the sprocket teeth at the two end or outer aperture plates, but is not necessarily positive in positioning the film at the central or middle aperture plate. I therefore provide means for increasing the action of one of the loops so that it exerts a greater longitudinal pressure on the film than the other loop. This may be done by locating a part such as a roller 50 so that it distorts one of the loops, increasing the pressure exerted by that loop.

In Fig. 6 of the drawings I disclose a form of the invention, very similar to that just described, except that I show a somewhat modified construction or mounting for the roller 50 and further show both film loops L being acted on to modify their natural or normal pressure action. The roller 50 provided to increase the tendency of the film to move in opposite directions from the loop and thus bear on the sprocket teeth to be held in definite position on the sprocket is mounted on a carrier 55 supported through a spring 56. The other loop L of the film is engaged by a roller 60 urged outwardly in the loop by a spring 61. The roller 60 is supported by a carrier 62 engaged by the spring 61. The roller 60 is urged outwardly by the spring 61 with sufficient force to balance or neutralize the longitudinal pressure due to the resiliency of the film and exert an opposite pressure on the film tending to draw the film longitudinally in both directions toward the loop. In this manner the spring 60 acting on the looped part L of the film modifies its normal action causing a definite positioning of the film F with reference to the sprocket teeth adjacent the loop.

From the foregoing description it will be apparent that my invention provides a film guiding means whereby the film is definitely positioned with reference to an aperture plate without being frictionally held as by pressure shoes or the like. Further it is to be particularly noted that the construction allows for a definite or positive positioning of the film guiding roller and yet permits of a patched film being operated through the mechanism. The absence of drag or friction on the film materially decreases the strain on the entire mechanism and improves the action of the mechanism. It is further to be pointed out that the utilization of pressure generated in or applied to a looped part of the film to position it with reference to an aperture plate or the like is a significant feature of the invention whereby I accomplish a result heretofore accomplished through mechanisms liable to injure the film or complicated in construction and operation. My invention in utilizing or acting through the looped part of the film provides an extremely simple, positive and efficient means of definitely locating the film with reference to one or more aperture plates.

Having described only a typical preferred form of my invention I do not wish to limit myself to the specific details set forth, but wish to reserve to myself any changes or variations that may appear to those skilled in the art or fall within the scope of the following claims.

Having described my invention, I claim:

1. A device for positioning a perforated strip of film including a sprocket having teeth engaging perforations at longitudinally spaced points maintaining a strained loop in the film between said points free of the sprocket, means for holding the film in engagement with the teeth at said points, and a member engaging the strained loop of the film.

2. A device for positioning a perforated strip of film including a sprocket having teeth engaging perforations at longitudinally spaced points maintaining a strained loop in the film free of the sprocket, means for holding the film in engagement with the teeth at said points and a member in pressure engagement with the loop.

3. In combination two aperture plates, means guiding a film at the plates for free longitudinal movement, an intermittently driven member, spaced parts on the member engaging the film to hold it with a loop portion between the plates free of the member, and a member in pressure engagement with the loop.

In witness that I claim the foregoing I have hereunto subscribed my name.

WALTER L. WRIGHT.